(12) United States Patent
Metois et al.

(10) Patent No.: US 7,046,808 B1
(45) Date of Patent: May 16, 2006

(54) METHOD AND APPARATUS FOR DETECTING PROCESSING STAGES APPLIED TO A SIGNAL

(75) Inventors: Eric Metois, Somerville, MA (US); Rade Petrovic, San Diego, CA (US); Kanaan Jemili, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 09/535,154

(22) Filed: Mar. 24, 2000

(51) Int. Cl.
*H04K 1/02* (2006.01)
*H04L 9/00* (2006.01)

(52) U.S. Cl. .................. 380/252; 713/176; 726/26
(58) Field of Classification Search ............... 713/176, 713/200, 201; 380/252–253, 100, 200–205, 380/54, 217, 236–238, 287; 705/57–59; 726/26, 31; 382/100
See application file for complete search history.

(56) References Cited

U.S. PATENT DOCUMENTS

| | | | | |
|---|---|---|---|---|
| 4,295,128 A | | 10/1981 | Hashemian et al. | |
| 4,755,884 A | * | 7/1988 | Efron et al. | 386/96 |
| 5,113,437 A | * | 5/1992 | Best et al. | 380/253 |
| 5,319,735 A | * | 6/1994 | Preuss et al. | 704/205 |
| 5,432,799 A | * | 7/1995 | Shimpuku et al. | 714/769 |
| 5,581,800 A | * | 12/1996 | Fardeau et al. | 455/2.01 |
| 5,822,360 A | * | 10/1998 | Lee et al. | 375/140 |
| 5,893,067 A | * | 4/1999 | Bender et al. | 704/502 |
| 5,940,124 A | | 8/1999 | Janko et al. | |
| 5,940,135 A | * | 8/1999 | Petrovic et al. | 348/473 |
| 5,945,932 A | * | 8/1999 | Smith et al. | 341/51 |
| 6,154,571 A | * | 11/2000 | Cox et al. | 382/250 |
| 6,415,041 B1 | * | 7/2002 | Oami et al. | 382/100 |
| 6,665,419 B1 | * | 12/2003 | Oami | 382/100 |

OTHER PUBLICATIONS

TASK AC122-Copy Protection for Distribution Services, Jul. 1, 1997 http://www.acad.bg/wise/english/rd/partners/acts/areal/ac122.5.thml.
C. Xu et al., "Applications of digital watermarking technology in audio signals", J. Audio Eng. Soc., vol. 47, No. 10, pp. 805-812, Oct. 1999.

(Continued)

*Primary Examiner*—Hosuk Song
(74) *Attorney, Agent, or Firm*—Lipsitz & McAllister, LLC

(57) ABSTRACT

A system for determining the amount of processing that has been applied to watermarked signal. A steganographic signal is provided that includes an original signal and an embedded fragile watermark. The fragile watermark is characterized by a low energy and a high redundancy in comparison to a robust watermark. The steganographic signal is communicated over a distribution channel to a decoder. At the decoder, a measure of a presence of the fragile watermark in the acquired steganographic signal is provided, along with an estimate of the fragility profile of the fragile watermark for this particular original signal. Based on these factors, a estimate is made of the amount of processing that the steganographic signal has undergone. This processing can include, for example, A/D and D/A conversions, resampling, band-limiting, perceptual compression/decompression, etc. Optionally, the fragility profile is derived prior to the distribution of the content and communicated by the steganographic signal for recovery by the decoder. Furthermore, a robust watermark may be provided in the steganographic signal that, e.g., designates the presence of the fragile watermark to a decoder.

22 Claims, 5 Drawing Sheets

OTHER PUBLICATIONS

J. Lacy et al., "Intellectual Property Protection Systems and Digital Watermarking," Proceedings: Information Hiding, Second International Workshop, Portland, Oregon, pp. 158-168, 1998.

L. Boney et al. "Digital Watermarks for Audio Signals," Dept. of Electrical Engineering, Univ. of Minnesota, Mar. 27, 1996.

M.F. Davidson, "Music File Filter," Sony Music, New York, May 23, 1999.

Philips Research Liquid Audio Fraunhofer Institute, "Digital Audio Screening Technology for Phased Rollout," v. 1.0, May 23, 1999.

"Microsoft Response to CfP for Technology Solutions to Screen Digital Audio Content for LCM Acceptance," Microsoft Corp., May 23, 1999.

"Audio Watermarking System to Screen Digital Audio Content for LCM Acceptance", Aris Technologies, Inc., May 23, 1999.

* cited by examiner

METHOD AND APPARATUS FOR DETECTING PROCESSING STAGES APPLIED TO A SIGNAL

BACKGROUND OF THE INVENTION

The present invention relates to processing of various signals (e.g., audio, video, and images) with embedded auxiliary data, or "watermarks", that are provided, e.g., for copyright protection purposes.

The promises of online distribution of digitized content are accompanied by an increasing threat of piracy. Digital content, such as digital music, video and still images, can now be freely communicated over computer networks such as the Internet. The entertainment industry is contemplating the opportunities of electronic commerce, where the true value of the product (the digital content) is dissociated from any particular physical medium (such as a compact disc (CD), digital video disc (DVD), or the like). While it enables a greater degree of flexibility in its distribution and a lower cost, the commerce of disembodied information raises serious copyright issues. Indeed, digital data can be re-packaged, duplicated and re-distributed at virtually no cost, potentially turning piracy into a simple "click and drag" process.

The usage and distribution of digitized content can reasonably be controlled as long as it remains within a proprietary format (or "secure environments"). However, the wide availability of various open formats makes it easy for any user to capture the content and re-package it outside this "secure environment". This is typically the first stage of a pirate distribution scheme.

For example, a user may purchase an audio CD anonymously from a store. The user may then extract ("rip") the audio content of this CD with a general purpose personal computer (PC). The user may further compress the resulting audio files using some arbitrary open source compression utility (MP3 for instance). Finally, the user may wish to redistribute (free of charge or not) the resulting shorter, compressed files through a free or low-cost online distribution scheme such as email, File Transfer Protocol (FTP) or Hypertext Transfer Protocol (HTTP). This kind of piracy is a great threat to the music industry, and it can be generalized to other types of contents and industries. For example, audio renditions of books, as well as lectures, interviews, educational and business presentations, and the like, are all subject to piracy. Audio/video data, such as movies, is similarly subject to piracy.

It naturally follows that various usage and copy control applications call for solutions that allow viewer/player/copying devices or systems to detect whether an acquired copy of valuable content (e.g., the audio content to be protected) has undergone any such illicit re-packaging.

A way to achieve this goal is to design a system that quantifies the amount of processing that was applied to the valuable content since it was originally distributed. For this purpose, the use of a volatile data layer is a commonly accepted concept. This volatile data layer, sometimes referred to as a "Fragile Watermark," is embedded within, or packaged along with the valuable content it protects. As the content is transferred onto a different medium type (or a different format), this volatile data layer is typically expected to be lost. Such a vanishing mark is also typically used in collaboration with a persistent data layer (e.g. a "Robust Watermark"), which is intended to survive such re-packaging of the valuable content, while signaling that the original copy of the content carried a volatile data layer.

When the viewer/player/copying device or system is presented with the resulting copy of the content, it will look for this volatile data if the persistent data layer indicates that it should be there. The presence of such persistent data and the absence of the volatile data layer is an indication that the content was re-packaged. Clearly, such volatile data should be resistant to forgery. Indeed, the ability of a non-authorized entity (e.g., pirate) to create (or re-create) such volatile data is the major threat scenario in the context of such systems.

Regardless of the actual methodology that is suggested by the prior art to carry the volatile and the persistent data layers, these proposals all share similar concept for the desired behavior of a Fragile Watermark layer. Moreover, these proposals suggest a binary state for such a volatile data layer. That is, the fragile watermark layer is considered to be either present or absent. Moreover, the volatile data is designed to be removed by very small manipulations of the content. In other words, with prior art schemes, the volatile, fragile watermark data can only survive a perfect bit-for-bit digital copy of the content.

While such prior methodologies might be adequate to authenticate an original copy of digitized content, their usefulness is challenged by the emerging concept of legitimate versus illegitimate manipulations. Indeed, conflicts between consumer rights and the content providers' (e.g., entertainment industry's) interests are drawing a rather fuzzy line between what consumers can and cannot do with an original copy of valuable content they purchased. If a system based on volatile data is used to prevent multi-generational copying (i.e., making a first copy of an original, making a second copy from the first copy, and so forth), it should also be able to preserve the consumer's rights regardless of the technological limitation of their equipment. As an example, a consumer should be allowed to make a first generation copy of audio content he/she purchased (such as on a portable medium such as a CD, or downloaded via a network such as the Internet to a computer storage device), even if his/her audio (CD) capturing equipment does not provide perfect digital transfers. For example some digital captures may involve digital-to-analog-to-digital conversions. Also, some CDs may have minor scratches that are patched over by a digital interpolation with only a minor degradation in quality, but still not making a perfect signal copy. Further, a high resolution audio signal (e.g., 96 kHz sampling rate, 24 bit per sample resolution) can be copied into the lower resolution CD format of 44.1 kHz sampling rate, 16 bit per sample resolution. Here again, the signal copy is not perfect. All such copies may be allowed, while content manipulations involving perceptual compression methods (such as MPEG) may be prohibited.

In contrast to the prior art, the present invention introduces a softer concept for a Fragile Watermark. While the proposed watermarking layer of the present invention is designed to be prone to degradation, it is also designed to degrade gracefully, as opposed to disappearing after any arbitrarily minor manipulation of the content. The present invention further suggests an appropriate analysis that uses this graceful degradation in the context of a content-dependent fragility analysis, to derive a quantitative measurement of the amount of "processing" that was applied to the valuable content. The "processing" includes manipulations such as analog-to-digital conversions, resampling, reduction in bit depths (number of bits per sample), band-limiting, perceptual compression, collapsing multi-channel audio into stereo or mono (for audio content), recording on analog media, and digital or analog broadcast.

Another objective of the present invention is to provide consumers with a quality assurance tool. Generally, it can be hard for the consumer to establish if the digital object he has acquired (digital music, image, video, etc.) is of high quality, matching that of the master copy, or if it has been degraded through distribution channels. Using the herein proposed Fragile Watermark, and appropriate detection hardware and/or software, it is possible to quantify the damage suffered in the distribution channel without directly comparing the content to the master copy.

Moreover, the fragility analysis component of the present invention can be used for a variety of other applications. Indeed, the analysis of the content's intrinsic fragility can be measured to inform a user that a watermark he/she is about to embed within the content is not going to survive in a selected channel. In cases where the content is explicitly produced with a known mode of distribution in mind, the user may wish to compensate for such content-dependant fragility and increase the strength of the watermark he/she is about to embed appropriately.

The present invention provides a data processing system having the above and other advantages.

SUMMARY OF THE INVENTION

The present invention provides a system for determining the amount of processing that has been applied to a watermarked signal.

The present invention provides means by which the degradation of a carefully designed watermark layer provides a quantitative measure of the amount of processing that was applied to valuable content (such as audio, video and image data) since the watermark was first embedded in the content.

The essence of the present invention includes the design of a fragile watermarking layer that owes its robustness to a large amount of redundancy, while injecting small amounts of energy in the cover signal (i.e., the valuable content). Such a Fragile Watermark layer is prone to degradation when the cover signal undergoes various processing stages, but still remains readable due to its large redundancy.

An acquired version of the content (such as audio data acquired by a user on a CD, or via an Internet download) is analyzed by measuring the degradation of the fragile watermark layer to derive a quantitative estimate of the amount of processing that was applied to the content since its original release (i.e., since the watermarking stage). The measurement of the degradation is taken in the context of a content-dependent Fragility analysis, and allows a determination of the nature and/or the amount of the processing that the content has experience, and whether the acquired content closely matches (to within a desired tolerance) the content before it underwent the processing.

Moreover, the fragility of the watermark can be measured to inform a user that the watermark is not going to survive in a selected channel, and that its strength should be increased accordingly.

Corresponding methods and apparatuses are presented.

BRIEF DESCRIPTION OF THE DRAWINGS

These and other aspects of the present invention will become more fully understood from the following detailed description of the preferred embodiments in conjunction with the accompanying drawings, in which.

DETAILED DESCRIPTION OF THE INVENTION

The present invention provides a system for determining the amount of processing that has been applied to a watermarked signal.

The following preferred embodiment is specifically set in the context of applications where the content comprises audio recordings, but is applicable generally to any type of data that can carry a watermark.

Like-numbered elements correspond to one another in the figures.

Figure 1A:
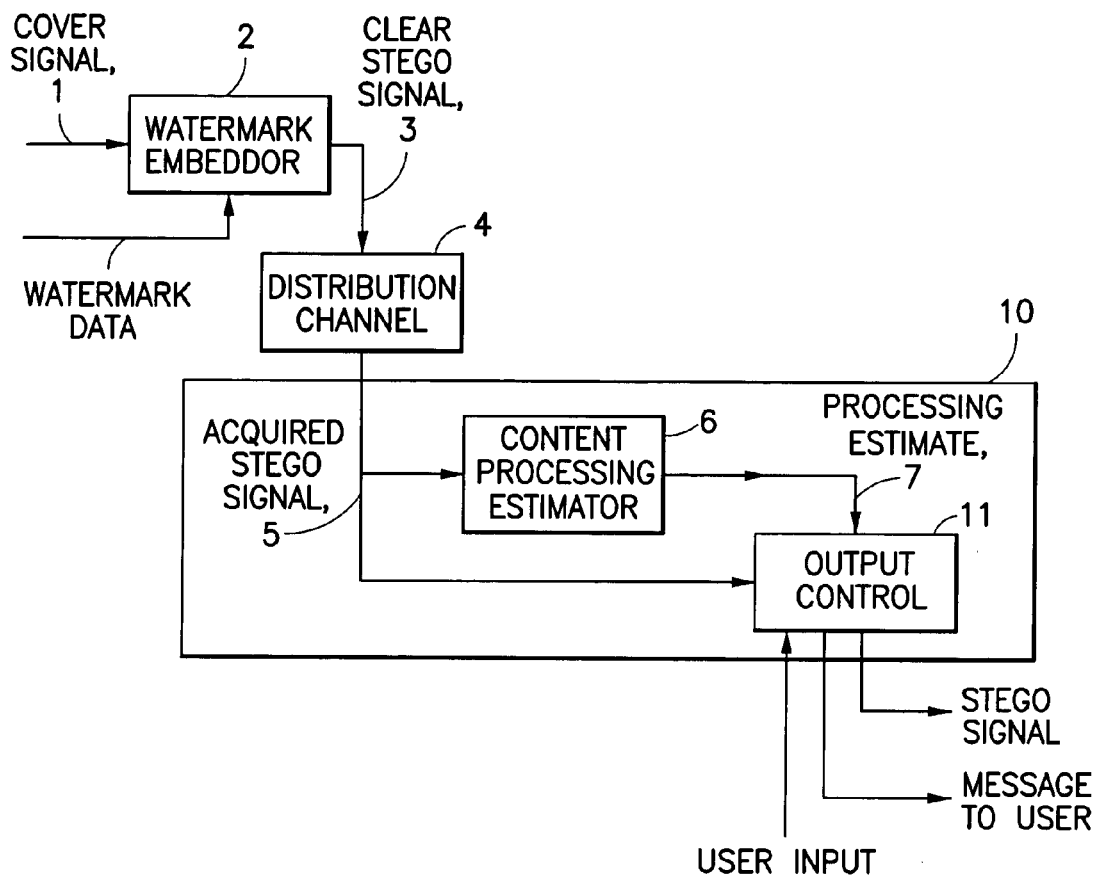
FIG. 1(a) is a top-level block diagram that illustrates a watermark embeddor, a distribution channel, and a content processing estimator for deriving a quantitative measure of the amount of processing that was applied to valuable content based on the degradation of a watermark, in accordance with the present invention.

FIG. 1(a) is a top-level block diagram that illustrates a watermark embeddor, a distribution channel, and a content processing estimator, in accordance with the present invention.

Prior to its distribution via a distribution channel, which might include recording on storage media 4, the cover (audio) signal 1 goes through a preparation stage, which include a watermark embeddor 2, leading to a clear "stego" (steganographic) signal 3. The cover signal comprises the audio content whose access is to be controlled by a watermark. The watermark embeddor 2 should be designed to embed digital data (watermark data) within the cover signal without affecting the quality of the content. For example, for audio data, the watermarked data should be provided substantially inaudibly.

If the content remains within the secure environment, the secure wrapper (encryption) serves as authentication. Even though the fragile watermark might be damaged by perceptual compression, the compliant player/viewer doesn't need to rely on this watermark (it has the digital secure wrapper to attest to the copy's legitimacy). In the context of the preferred embodiment for this invention, we envision using the feature-modulation watermarking techniques described in any of U.S. Pat. No. 5,940,135 to Petrovic at al., entitled "Apparatus and Method for Encoding and Decoding Information in Analog Signals," issued Aug. 17, 1999; U.S. patent application Ser. No. 08/974,920 to Petrovic at al., entitled "Apparatus and Method for Embedding and Extracting Information in Analog Signals Using Distributed Signal Features," filed Nov. 20, 1997, now U.S. Pat. No. 6,175,627, issued Jan. 16, 2001; and U.S. patent application Ser. No. 09/106,213 to Petrovic, entitled "Apparatus and Method for Embedding and Extracting Information in Analog Signals Using Replica Modulation," filed Jun. 29, 1998, now U.S. Pat. No. 6,427,012, issued Jun. 30, 2002; all of which are commonly assigned to the assignee hereof, and are incorporated herein by reference.

These core watermarking technologies, offered by Verance Corp., offer many advantages, including a higher degree of resistance to forgery than least-significant-bit (LSB) approaches to Fragile watermarking. This advantage occurs since Verance's watermarks are intimately related to the original signal and cannot be stripped and transferred from one digital object to another, or from original to later generations of the same digital object.

As the content is distributed to an end-user's receiver 10, the user will eventually hold an acquired stego signal 5, which was derived from the clear stego signal 3 through the distribution channel 4. The nature of the processing within this distribution channel is unknown, and we recall that the purpose of this invention is to gain a quantitative measurement of the severity of this processing. The content processing estimator 6 is the module that is responsible for deriving such a quantitative estimate 7 from the analysis of the acquired stego signal 5. As mentioned, this analysis stage is partially based on the measured degradation of a Fragile watermark layer that was embedded within the content by the original watermark embeddor 2.

The receiver 10 also includes an output control 11 that receives the processing estimate and the acquired stego signal. Based on the processing estimate, the output control 11 may output the stego signal and/or a message to the user. The output control 11 also may receive a user input.

Below, we discuss general issues surrounding the design of robust and fragile watermarks before we present alternative choices for the nature of the watermark embeddor 2 and the corresponding content processing estimator 6.

1. About the Robustness and Fragility of Watermarks
Designing a Fragile Watermark Layer Verance's distributed feature modulation core technology, referenced above, was originally designed to lead to both transparent and robust watermarks. This technology can be adapted to the design of a fragile watermark layer in accordance with the present invention. Indeed, the physical layer that carries the watermark can be tuned to inject smaller amounts of energy within the content. This leads to watermarks that are typically more prone to degradation than in the context of other "Robust Watermark" applications, such as, e.g., content identification for instance. At the same time, such a "fragile" physical layer is used to transmit highly redundant information to make up for the fact that it is prone to such degradation. As a simple example of added redundancy, we can repeat the same data bits, e.g., tens or hundreds of times. The resulting raw bit stream has a much higher rate than the actual data (tens or hundreds of times). Even if a high percentage of those raw bits are destroyed through the distribution channel, it is still possible to recover the original data bits reliably. Further, after recovering these data bits, it is possible to look at the percentage of incorrect bits in the raw bit stream and to derive a bit-error-rate (BER) measurement. Alternative ways to add redundancy to increase robustness of the data include repetition of the segments of the watermark, repetition of the whole watermark, and/or utilization of error correction codes, well known to those skilled in the art.

Besides using less energy and higher redundancy than in a Robust Watermark, other technology adjustments are important as well. These adjustments may be classified in two groups: (a) improvement in the watermark presence in the clear signal, and (b) increase of the watermark sensitivity to additive white Gaussian noise (AWGN).

Generally speaking, the distributed feature modulation techniques referenced above insert a watermark in such a way to move a desired feature of the watermark (such as the short-term autocorrelation) to a chosen target value. However, such a process is imperfect, and small variations occur due to non-ideal filtering, inter-symbol interference, approximations in the algorithm, etc. Those variations are less significant for a Robust Watermark, since there is more inserted energy, and more tolerance to inherent variations. In the case of a Fragile Watermark, it is important to reduce all imperfections as much as possible and use inserted energy very precisely. In accordance with the invention, we found that it is advantageous to use an iterative process. Specifically, after the fragile watermark is embedded, we go back and analyze if the target feature values are met, and if not, we make corrections to the inserted watermark to get closer to the chosen target.

AWGN represents a typical signal corruption in a signal distribution chain. Besides, many other distortions can be approximated with AWGN, such as quantization noise in analog-to-digital (A/D) conversion, lossy compression noise (such as MPEG noise), nonlinear distortion noise, etc. Therefore, it is important to make the Fragile Watermark sensitive to AWGN and similar types of distortion. One way is to use a smaller amount of energy for watermark embedding. Then, for the same amount of AWGN, the signal-to-noise ratio (SNR) at the watermark detector becomes worse, and the watermark deterioration more evident.

Further, we found that it is advantageous to insert a watermark biased toward high frequencies of the signal spectrum. Typically, at high frequencies, there is less of the signal energy, while AWGN is uniformly distributed over the frequency axis. Therefore, the presence of noise is easier to detect at high frequencies than at low frequencies.

In the context of the present invention, the "Presence" of a fragile watermark layer refers to a quantitative measurement of the certainty with which such layer is read from the content. It is not meant to be restricted to a two-stage, binary value (e.g., where the fragile watermark layer is considered to be either present or absent). For example, the Presence can take the form of a measured raw bit error rate at the level of the raw bit stream that carries the watermark.

The Presence of such a fragile watermark layer can subsequently be used to quantify the content's degradation.

About the Relevance of the Measured Presence of a Watermark Layer

It is imperative for any useful watermarking technology that the process of embedding a watermark within content does not lead to perceivable artifacts. The watermarked content (e.g., audio host signal) should be perceptually identical to its original non-watermarked parent with respect to its intended use. This typically has two major implications.

First, content (or a section of the content) that is naturally weak (for instance, it might exhibit very little energy within the coding band), is also a weak carrier of the embedded watermark data. This data will subsequently be particularly prone to degradation.

Second, for content (or a section of the content) that is determined to be perceptually sensitive (i.e., perturbations are more likely to lead to perceptual artifacts), the watermarking technology will typically tend to tone the watermark down (i.e., reduce the strength of the watermark). For audio content, the task of estimating such sensitivity is performed by a psychoacoustic analysis stage, which accounts for human hearing characteristics. For example, a steady single instrument tone is typically more sensitive than a noisy rock concert segment. The resulting content-dependent adjustments of the physical layer essentially weaken the watermarks that are being embedded in sensitive segments of the content.

The two previous cases clearly illustrate that the Fragility of a watermark is always content-dependent. It follows that, to estimate the amount of processing that was applied to the content, a Presence measurement may not be sufficient. Such a measurement will have to be taken in the context of a Fragility analysis of the content that carries the watermark.

About Fragility Analysis

We recall that "Presence" is a quantitative measurement of the certainty with which a Fragile Watermark is read from the content.

The purpose of a Fragility analysis module in accordance with the invention is to estimate the Fragility Profile of a fragile watermark layer in the case of content contamination. We recall from our prior discussion that fragility is content-dependant. The Fragility Profile is a model that describes how quickly the Presence of the fragile watermark will decrease when the content is submitted to increasingly severe contaminations (deterioration/degradation).

Figure 1B:
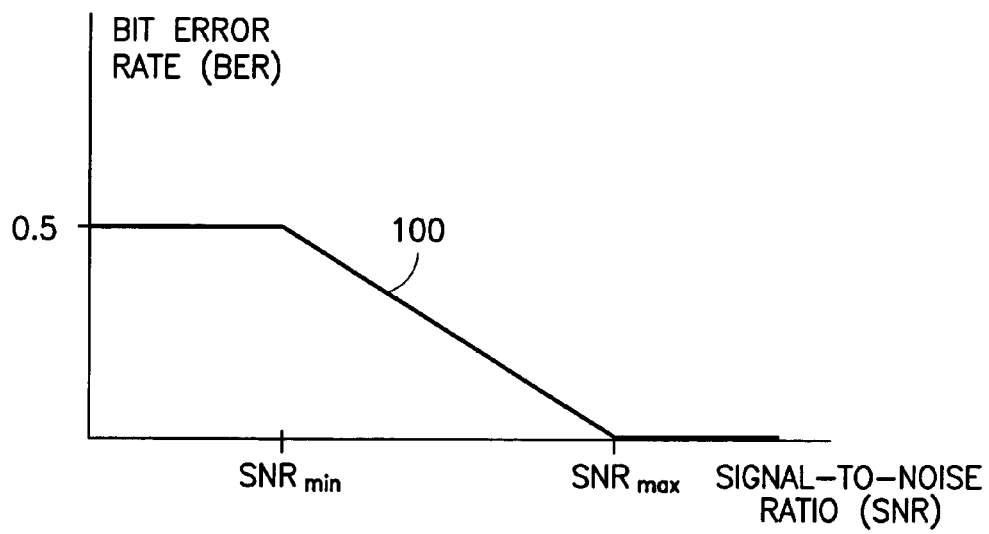
FIG. 1(b) illustrates an example fragility profile in accordance with the present invention.

For example, as shown in FIG. 1(b), the Fragility Profile could describe a piece-wise linear function 100 approximating the relationship between the BER of the watermark's raw bit stream and the signal to noise ratio resulting from an additive white noise contamination of the watermarked content. This choice of a simple piece-wise linear description could lead to a Fragility Profile of the following form:

$BER=0.5$ if $SNR<SNR_{min}$;

$BER=0.0$ if $SNR>SNR_{max}$; and $BER=0.5*(SNR_{max}-SNR)/(SNR_{max}-SNR_{min})$ otherwise.

In the context of such model, the Fragility analysis module would simply output the data pair $(SNR_{min}; SNR_{max})$ for distribution to a decoder.

By measuring the Fragile watermark layer's Presence from a segment of an acquired copy of the content, and estimating the Fragility Profile for this segment in a Fragility analysis module, we are able to estimate how much processing was applied to this copy within the unknown distribution channel. For example, by measuring the BER in the received Fragile Watermark raw bit stream, and estimating the rate at which the BER increases with the energy of an additive noise contamination, we can estimate how much noise was introduced by the distribution channel. Based on this result, we can further deduce whether an illegitimate processing has occurred.

For example, if the measured BER in the received Fragile Watermark raw bit stream is 0.25 (or 25%) and the estimated rate at which the BER increases with the energy of an additive noise contamination is expressed by our previous piece-wise linear Fragility Profile example with:

$(SNR_{min}; SNR_{max})=(0$ dB; $80$ dB$)$, then $SNR=SNR_{max}-2*BER*(SNR_{max}-SNR_{min})$;

i.e., $SNR=80-160*BER=80-160*0.25=40$ dB;

i.e., we can estimate that the contamination that was introduced by the distribution channel is equivalent to a 40 dB SNR additive noise contamination. If it were further established within some usage rules that any manipulation leading to an SNR of 50 dB or less was illegitimate, we could conclude that illegitimate processing had occurred.

This Fragility analysis can take place either at the detection stage, e.g., within the content processing estimator module 6 (FIG. 1(a)), or at the embedding stage, within the watermark embeddor 2. In the latter case, the outcome of such analysis is communicated to the estimator module 6 via some persistent data channel.

Optionally, the content's intrinsic fragility can be measured to inform a user that a watermark he/she is about to embed within the content is not going to survive in a selected channel, thereby enabling the strength of the watermark to be increased by the user. Or, the strength of the watermark can be increased automatically.

As discussed earlier, a Fragile watermark layer may still be able to convey such persistent data if this data is encoded with a sufficient redundancy. As an alternative, or perhaps as a way to extend the system's range of operation, an additional robust watermark layer could convey such persistent data.

Deriving an estimate of the Fragility Profile may be achieved in a variety of ways within the Fragility analysis. As an illustration, the following are three major classes of methods that may be used.

(1) On one hand, this estimate can be derived from an actual measurement. For instance, the Fragility analysis could watermark the Fragile layer, contaminate the content, and measure the resulting Presence for the layer. While such a method might appear costly, it may share a lot of processing with other modules that constitute the watermark embeddor 2. This alternative may be particularly appropriate in cases where the Fragility analysis is to take place at the watermark embeddor stage 2.

(2) Similarly, some watermarking techniques may offer self-diagnosis indicators at the embedding stage. In other words, the watermark embedding process may already provide data that can be used to quantify the Fragility of the embedded watermark for no additional cost. As an illustration, a measure of the actual energy that was injected within the cover signal may be a reasonable data to derive the Fragility Profile from. Once again, such an alternative is most likely to be appropriate in cases where the Fragility analysis is to take place within the watermark embeddor 2.

(3) On the other hand, the exact nature of the watermark methodology typically suggests audio signal features that indicate the intrinsic fragility of the watermark layer. From the previous discussion, and for the purpose of the preferred embodiment, we suggest two types of time-varying features that may be derived from the audio content to predict its inherent fragility: the coding band's energy, and its psychoacoustic sensitivity. The coding band will correspond to the component of the original content that is used to carry the watermark. Any component that is outside of this coding band is ignored by the watermarking stage and, as such, its energy is irrelevant to the ability of the audio content to carry the watermark. Similarly, a relevant estimation of the content's psychoacoustic sensitivity should follow similar principles as the analysis that takes place within the watermark embeddor 2.

We recall that psychoacoustic sensitivity is a measure of the potential that a perturbation may produce perceivable artifacts. For example, segments of the audio content that exhibit sharp spectral peaks are typically more psychoacoustically sensitive. This characteristic has traditionally been referred to as the content's tonality. For cost-effectiveness, an estimate of the Fragility Profile can be derived from only a subset of all known relevant audio signal features.

The three previous classes of approaches are examples only, as the fragility analysis of the present invention may be designed in any number of ways. The three classes illustrate three major design philosophies. The best approach can share concepts of these classes, as they are not mutually exclusive.

2. Solutions Using a Fragile Watermark Layer Only

We recall that, despite its "fragility-by-design", a Fragile watermark layer may still convey persistent data if this data is encoded with sufficient redundancy. This section presents examples of the invention's embodiments which use only a fragile watermark layer. We also recall that the essential fragility analysis may take place either at the detection stage within the content processing estimator 6, or at the embedding stage within the watermark embeddor 2. Examples 1 and 2, below, illustrate these two alternatives.

Fragility Analysis at the Detection Stage

EXAMPLE 1

Figure 2:
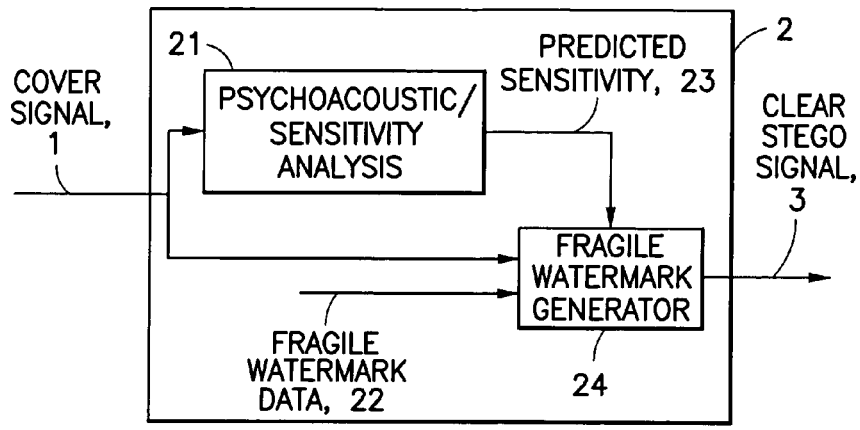
FIG. 2 is a block diagram of a watermark embeddor in the context of a first example of the preferred embodiment of the invention.
Figure 3:
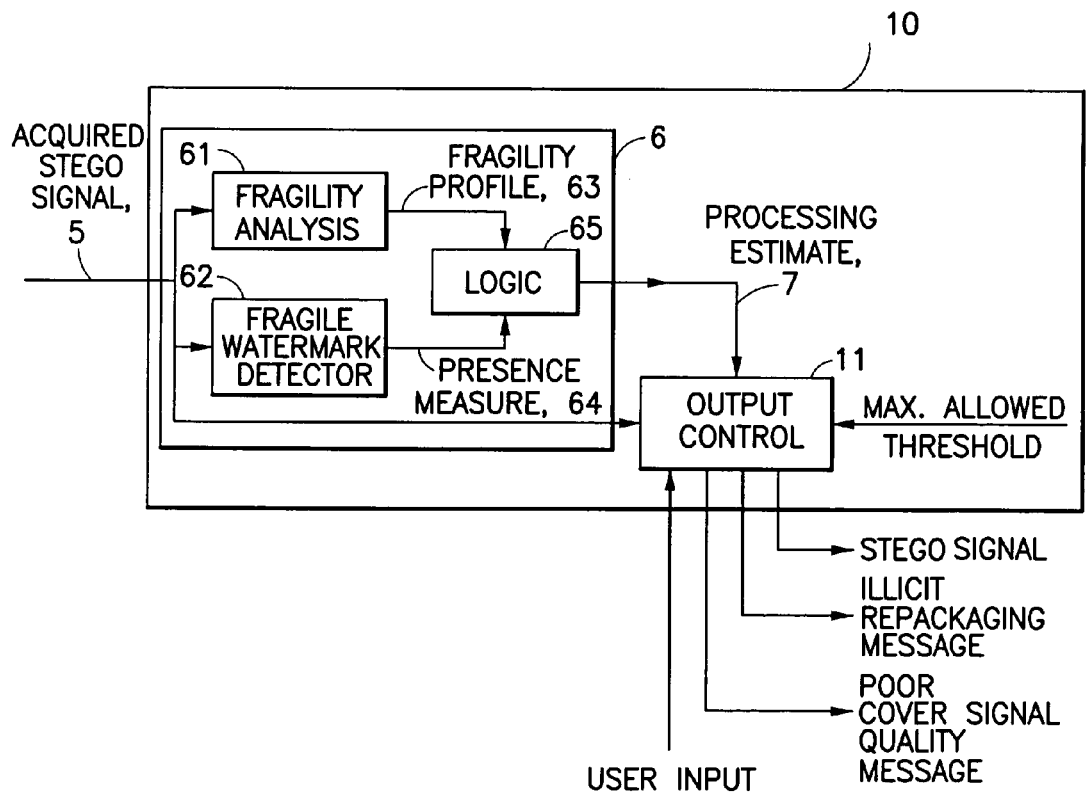
FIG. 3 is a block diagram of a content processing estimator in the context of the first example of the preferred embodiment of the invention.

FIG. 2 and FIG. 3 illustrate the choices for the architecture of the watermark embeddor 2 and the corresponding content processing estimator 7 in the context of this example. On the embeddor side (FIG. 2), the cover signal 1 is processed through a fragile watermark generator 24 to lead to the clear stego signal 3. The fragile watermark data 22 is fixed with respect to the cover signal fragility. To ensure that the entire embedding process does not affect the audio quality of the cover signal, the watermark generator 24 is controlled by a psychoacoustic/sensitivity analysis module 21, which analyzes the cover signal 1 and produces its predicted sensitivity 23. The higher the predicted sensitivity, the less energy will be injected by the watermark generator 24.

On the processing estimator (receiver) side (FIG. 3), the acquired stego signal 5 is sent to both a fragile watermark detector 62 and a fragility analysis module 61. The detection results provide a Presence Measure 64 for each detected fragile watermark. At the same time, the fragility analysis 61 provides a Fragility Profile 63. We recall that this profile provides an expectation of the deterioration in the fragile layer's presence following various degrees of content contamination. A logic module 65 estimates the amount of processing in the distribution channel based on the Fragility Profile 63 and the Presence Measure 64. The result can be presented as an output labeled Processing Estimate 7.

The Processing Estimate 7 can be further compared to a maximum allowed processing value, e.g., at the output control 11, and, if the estimated processing is above the threshold, illicit re-packaging is deduced, and further usage is prevented. Specifically, an illicit re-packaging message can be sent to the user. Alternatively, the user can be informed that the digital object he has acquired does not meet a high quality criterion, via a poor cover signal quality message, and leave further action to the user, e.g., via the user input. If there is no illicit re-packaging, e.g., the estimated processing is not above the threshold, the stego signal can be output, e.g., to a monitor, TV set, speakers or to a memory, or for another use as desired by the user.

Fragility Analysis at the Embedding Stage

EXAMPLE 2

Figure 4:
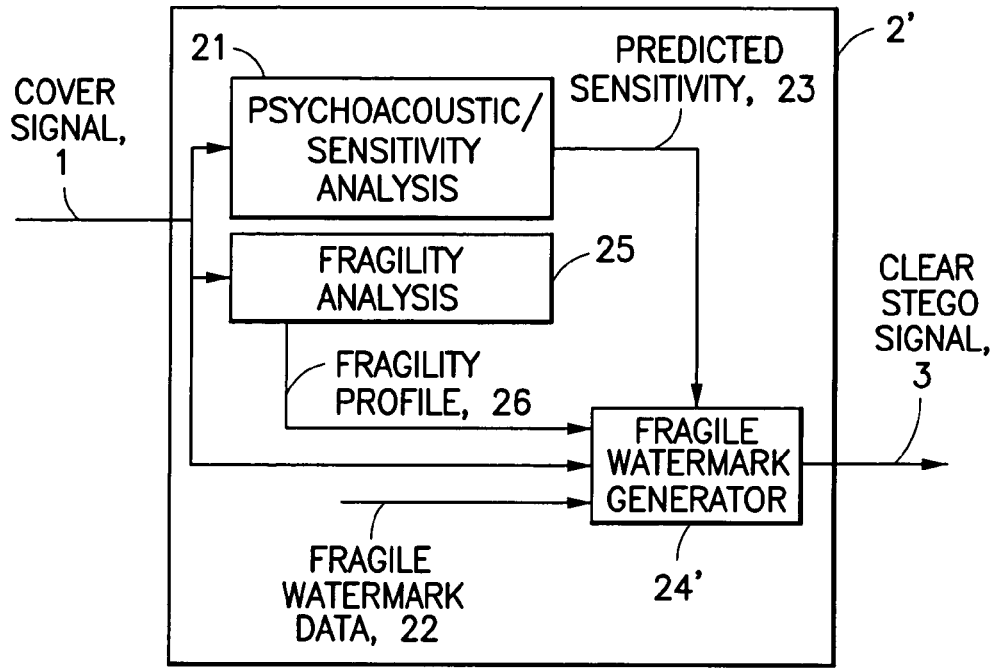
FIG. 4 is a block diagram of a watermark embeddor in the context of the second example of the preferred embodiment of the invention.
Figure 5:
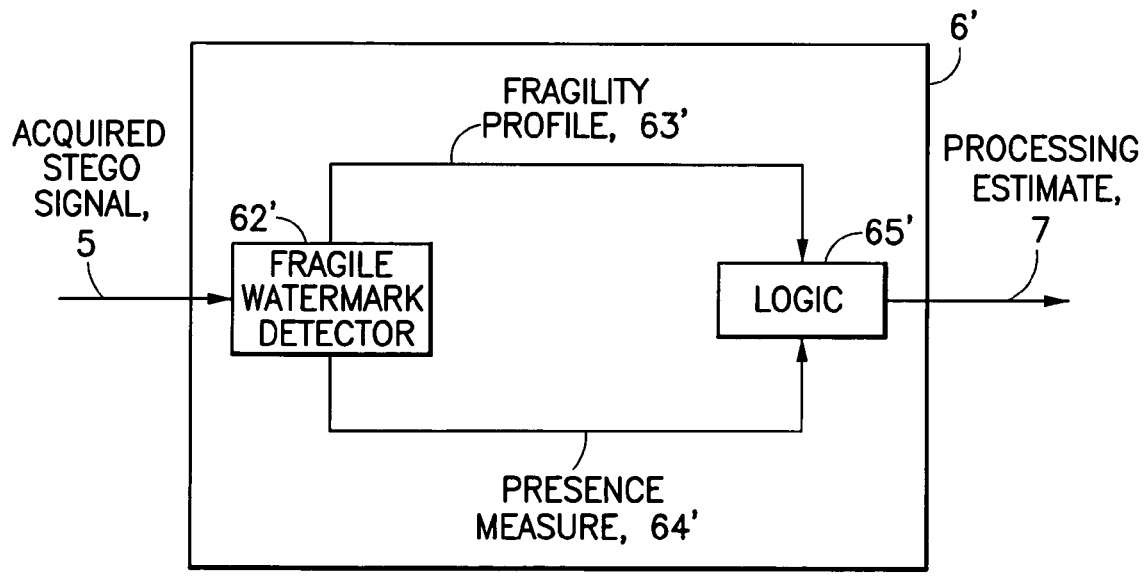
FIG. 5 is a block diagram of a content processing estimator in the context of the second example of the preferred embodiment of the invention.

FIG. 4 and FIG. 5 illustrate the choices for the architecture of the watermark embeddor 2' and the corresponding content processing estimator 6' in the context of this example. On the embeddor side (FIG. 4), the cover signal 1 is processed through a fragile watermark generator 24' to lead to the clear stego signal 3. The fragile watermark data 22 is combined with the results of the fragility analysis module 26 to form a message that is embedded into the cover signal 1. As previously seen with the watermark generator 24 (FIG. 2), the watermark generator 24' is controlled by a psychoacoustic/sensitivity analysis module 21, which analyzes the cover signal 1 and produces its predicted sensitivity 23.

The Fragility analysis function 25 provides a Fragility Profile to the Fragile watermark generator 24'. This information is carried in the watermark in the clear stego signal.

On the processing estimator side (FIG. 5), the acquired stego signal 5 is sent to the fragile watermark detector 62'. The detected watermark data that is carried by this layer provides a Fragility Profile 63' for the physical layer. The detection results provide an actual Presence Measure 64' for each detected fragile watermark. The desired Processing Estimate 7 is then derived from the Fragility Profile 63' and the Presence Measure 64', by the logic in the module 65'. Such a logic module 65' is very similar to the module 65 used in the previous example.

Figure 7:
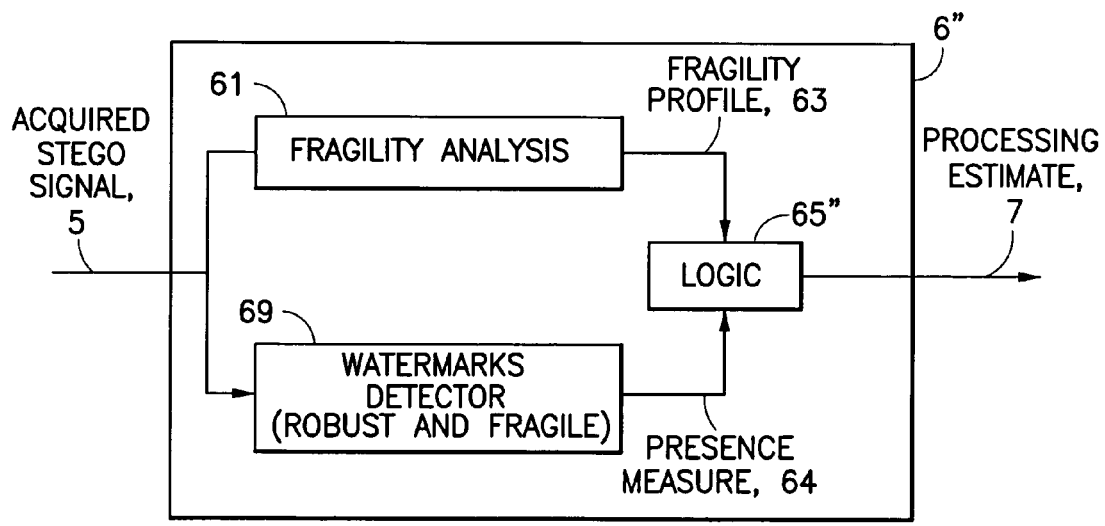
FIG. 7 is a block diagram of a content processing estimator in the context of the third example of the preferred embodiment of the invention.
Figure 9:
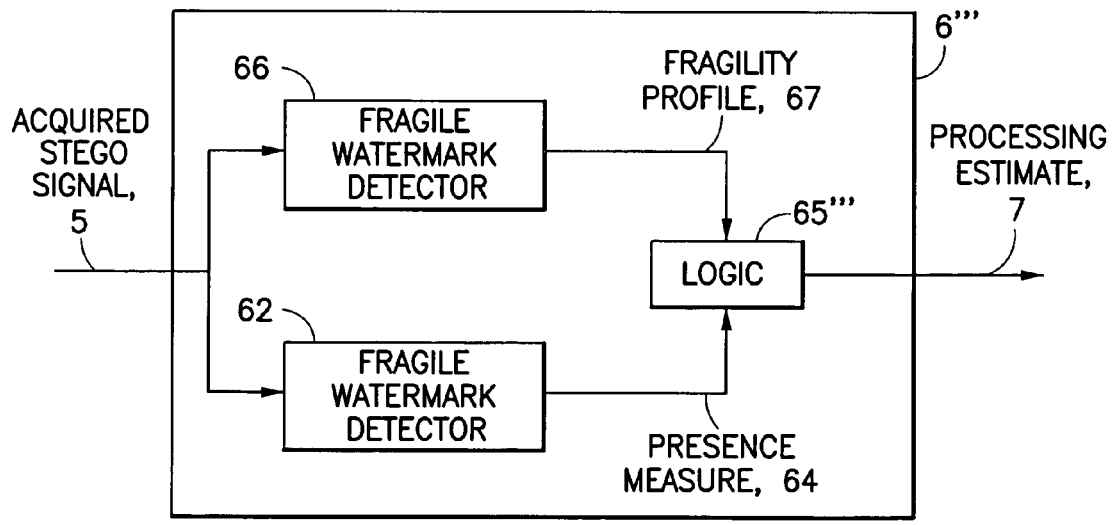
FIG. 9 is a block diagram of a content processing estimator in the context of the fourth example of the preferred embodiment of the invention.

For FIGS. 5, 7 and 9, an output control may also be used as discussed above in connection with the output control 11 of FIG. 3. Additionally, the content processing estimator 6', 6" and 6''' may be provided in a receiver corresponding to the receiver 10 of FIG. 3.

The receiver may be located with a recording device, such as a PC or DVD/CD recorder, but it can be located in players as well.

3. Solutions Using Both Fragile and Robust Watermark Layers

As discussed, the designer of the system may wish to use a Robust watermark layer in addition to the Fragile Watermark layer. This might be done to extend the system's range of operation, i.e., to allow the system's operation even in an environment where a fragile watermark cannot survive, such as low rate perceptual compression channels, severe band-limiting channels, noisy tape recording channels, etc. Further, the robust watermark can carry more data efficiently, and the fragile watermark can be better tailored to the signal processing measurement if it does not need to carry too much information.

As before, we also recall that the essential fragility analysis may take place either at the detection stage within the content processing estimator 6, or at the embedding stage within the watermark embeddor 2. Example 3 and Example 4 below illustrate these two alternatives.

Fragility Analysis at the Detection Stage

EXAMPLE 3

Figure 6:
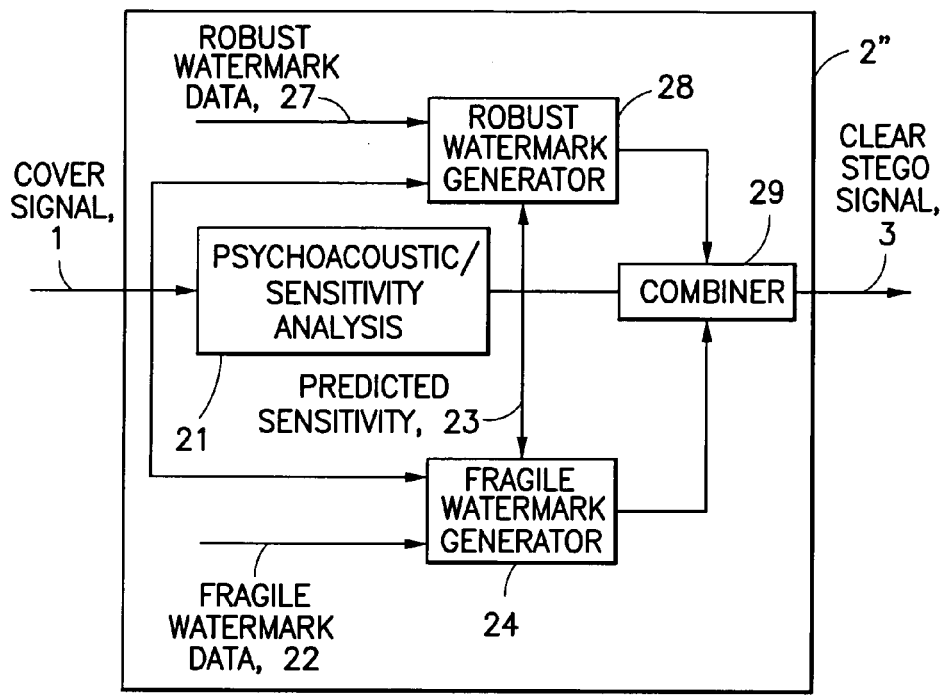
FIG. 6 is a block diagram of a watermark embeddor in the context of the third example of the preferred embodiment of the invention.

FIG. 6 and FIG. 7 illustrate the choices for the architecture of the watermark embeddor 2" and the corresponding content processing estimator 6" in the context of this example. On the embeddor side (FIG. 6), the cover signal 1 is processed through a robust watermark generator 28, a fragile watermark generator 24, and a combiner 29 to form the clear stego signal 3, which carries both robust and a fragile watermark layers. In the context of this example, both the robust and the fragile watermarks carry fixed watermark data with respect to the fragility analysis. As discussed, the watermark generators 24 and 28 are controlled by a psychoacoustic/sensitivity analysis module 21, which analyzes the cover signal 1 and produces its predicted sensitivity 23.

On the processing estimator side (FIG. 7), the acquired stego signal 5 is sent to both a watermark detector 69 and a fragility analysis module 61. The watermark detector 69 is designed to look for both the robust watermark layer and the fragile watermark layer. The detection results include the extracted robust watermark and a Presence Measure 64 for each detected fragile watermark. At the same time, the fragility analysis 61 provides a Fragility Profile 63, which provides an expectation of the fragile layer's deterioration following various amounts of content contamination. The desired Processing Estimate 7 is then derived from the Fragility Profile 63 and the Presence Measure 64, by the logic module 65".

Fragility Analysis at the Embedding Stage

EXAMPLE 4

Figure 8:
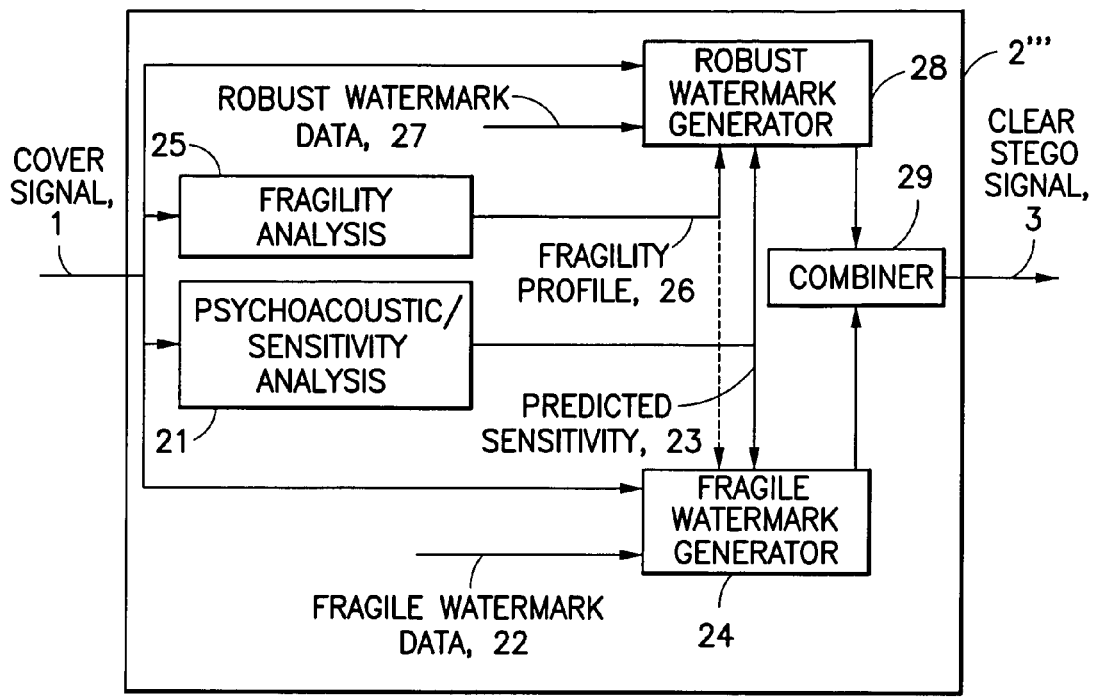
FIG. 8 is a block diagram of a watermark embeddor in the context of the fourth example of the preferred embodiment of the invention.

FIG. 8 and FIG. 9 illustrate the choices for the architecture of the watermark embeddor 2''' and the corresponding content processing estimator 6''' in the context of this example. On the embeddor side (FIG. 8), the cover signal 1 is processed through a robust watermark generator 28, a fragile watermark generator 24, and a combiner 29 to form the clear stego signal 3, which carries both a robust watermark layer and a fragile watermark layer. While the fragile watermark data 22 is fixed with respect to the fragility analysis, the robust watermark data 27 is combined with the results of the fragility analysis module 25 to yield a message that is embedded into the cover signal 1.

Both watermark generators 24 and 28 are controlled by a psychoacoustic/sensitivity analysis module 21, which analyzes the cover signal 1 and produces its predicted sensitivity 23. The Fragility Profile 26 that was estimated by the fragility analysis module 25 can further influence the fragile watermark generator. For instance, one may wish to bypass the generation of the fragile watermark layer if such an estimate indicates that such a fragile layer has a very small chance to survive any subtle manipulation of the content.

On the processing estimator side (FIG. 9), the acquired stego signal 5 is sent to both a robust watermark detector 66 and a fragile watermark detector 62. The Fragility Profile 67 for the fragile layer is carried by the robust watermark data. At the same time, the fragile watermark detector 62 provides detection results in the form of a Presence Measure 64 for each detected fragile watermark. The desired Processing Estimate 7 is then derived from the Fragility Profile 67 and the Presence Measure 64, by the logic module 65'''.

CONCLUSION

It should now be appreciated that the present invention provides a system for determining the amount of processing that has been applied to watermarked signals. In particular, a steganographic signal is provided that includes audio, video or other content, along with an embedded fragile watermark. The fragile watermark is obtained by adjusting the energy of a fragile watermark layer and providing additional redundancy for this data. The steganographic signal is communicated over a distribution channel to a decoder. At the decoder, a measure of a presence of the fragile watermark in the acquired steganographic signal is provided, along with an estimate of the content-dependant fragility profile of the fragile watermark. Based on these factors, a processing estimate is made that indicates the amount of processing that the steganographic signal has undergone. This processing can include, for example, D/A and A/D conversions, perceptual compression/decompression, resampling, bit depth reductions, band-limiting, dynamic range reductions, broadcasting over TV or radio channels, and so forth.

Optionally, the Fragility Profile is derived prior to the distribution of the content and communicated in the steganographic signal for recovery by the decoder.

Furthermore, a robust watermark may be provided in the steganographic signal that, e.g., designates the presence of the fragile watermark to a decoder.

In a further option, the content's intrinsic fragility can be measured to inform a user that a watermark he/she is about to embed within the content is not going to survive in a selected channel, thereby enabling the strength of the watermark to be increased.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for using a watermark to estimate a nature and/or an amount of processing that is applied to a signal, comprising the steps of:
   embedding a watermark with a degree of redundancy into the signal to form a steganographic signal;
   measuring a deterioration of the embedded watermark in the steganographic signal after the steganographic signal undergoes the processing, said deterioration of the embedded watermark being based on recovered data bits from a plurality of said redundantly embedded watermarks; and
   estimating the nature and/or the amount of the processing based on the measured deterioration.

2. The method of claim 1, wherein:
   said estimating step estimates an intrinsic fragility of the watermark by analyzing characteristics of the steganographic signal.

3. The method of claim 1, comprising the further step of:
   controlling an output of the steganographic signal when the amount of the estimated processing exceeds a threshold level.

4. The method of claim 1, wherein:
   the nature and/or the amount of the estimated processing indicates whether the steganographic signal has undergone unauthorized processing.

5. The method of claim 1, wherein:
   a user acquires the steganographic signal after it undergoes the processing; and
   the nature and/or the amount of the estimated processing indicates whether the acquired steganographic signal closely matches the steganographic signal before it undergoes the processing.

6. The method of claim 5, comprising the further step of:
   providing a message to the user indicating whether the acquired steganographic signal closely matches the steganographic signal before it underwent the processing.

7. The method of claim 1, wherein the processing that the steganographic signal undergoes comprises at least one of:
multi-generational copying;
perceptual compression and decompression;
digital-to-analog and analog-to-digital conversion;
resampling;
a bit depth reduction;
band-limiting;
dynamic range reduction; and
transmission over a communication channel.

8. The method of claim 1, wherein:
the deterioration of the embedded watermark is measured in accordance with a fragility profile of the embedded watermark.

9. The method of claim 8, wherein:
the fragility profile denotes a relationship between a bit error rate of the watermark and a signal to noise ratio of the steganographic signal.

10. The method of claim 1, wherein:
the watermark is embedded in the signal in accordance with a predicted sensitivity of the signal that is based on a psychoacoustic analysis thereof.

11. The method of claim 1, wherein:
the steganographic signal further includes an embedded robust watermark that signals a receiver that the watermark with redundancy is present in the steganographic signal.

12. The method of claim 1, wherein:
the steganographic signal comprises at least one of audio and video content.

13. A method for providing a signal with a watermark layer, comprising the steps of:
analyzing an intrinsic fragility of the signal, which is a carrier of the watermark layer; and
determining a fragility profile in response to said analyzing step;
wherein the fragility profile denotes a relationship between a bit error rate of the watermark layer and a signal to noise ratio of the signal after the watermark layer and the signal are degraded.

14. The method of claim 13, wherein the watermark layer is embedded into the signal to form a steganographic signal, comprising the further step of:
subjecting the steganographic signal to at least one processing step;
wherein the fragility profile denotes a deterioration of the embedded watermark layer due to said at least one processing stage.

15. The method of claim 13, wherein:
the intrinsic fragility analysis is applied to a cover portion of the signal before the signal is degraded by at least one processing step to indicate whether or not the watermark layer will survive the processing step.

16. The method of claim 15, comprising the further step of:
increasing a power of the watermark layer in the signal before the signal is degraded by the processing step if the intrinsic fragility analysis indicates that the watermark layer will not survive the processing step.

17. The method of claim 13, wherein:
the intrinsic fragility analysis is applied to a cover portion of the signal to suggest eventual modifications of a configuration of a watermarking system used to provide the watermark layer to ensure a survival of the watermark layer through a specified processing stage.

18. The method of claim 13, wherein:
after the analyzing and determining steps, the signal, and data designating the fragility profile, are distributed to a decoder.

19. The method of claim 18, wherein:
the data designating the fragility profile is carried in the signal.

20. The method of claim 18, wherein:
the data designating the fragility profile is carried in the signal in another watermark layer.

21. An apparatus for using a watermark to estimate a nature and/or an amount of processing that is applied to a signal, comprising:
means for embedding a watermark with a degree of redundancy into the signal to form a steganographic signal;
means for measuring a deterioration of the embedded watermark in the steganographic signal after the steganographic signal undergoes the processing, said deterioration of the embedded watermark being based on recovered data bits from a plurality of said redundantly embedded watermarks; and
means for estimating the nature and/or the amount of the processing based on the measured deterioration.

22. An apparatus for providing a signal with a watermark layer, comprising:
means for analyzing an intrinsic fragility of the signal, which is a carrier of the watermark layer; and
means for determining a fragility profile in response to said analyzing step;
wherein the fragility profile denotes a relationship between a bit error rate of the watermark layer and a signal to noise ratio of the signal after the watermark layer and the signal are degraded.

* * * * *